US008977418B2

(12) United States Patent
Bissontz

(10) Patent No.: US 8,977,418 B2
(45) Date of Patent: Mar. 10, 2015

(54) OPERATOR INTERFACE FOR VEHICLES

(75) Inventor: Jay E. Bissontz, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 12 days.

(21) Appl. No.: 13/978,766

(22) PCT Filed: Feb. 16, 2011

(86) PCT No.: PCT/US2011/024989
§ 371 (c)(1),
(2), (4) Date: Jul. 9, 2013

(87) PCT Pub. No.: WO2012/112145
PCT Pub. Date: Aug. 23, 2012

(65) Prior Publication Data
US 2013/0317681 A1 Nov. 28, 2013

(51) Int. Cl.
B60W 10/196 (2012.01)
B60T 1/10 (2006.01)
(Continued)

(52) U.S. Cl.
CPC ............... *B60W 10/196* (2013.01); *B60T 1/10* (2013.01); *B60T 7/042* (2013.01); *B60W 50/082* (2013.01); *B60K 6/48* (2013.01); *B60W 50/14* (2013.01); *B60W 10/06* (2013.01); *B60W 10/08* (2013.01); *B60W 30/18127* (2013.01); *B60L 7/18* (2013.01); *F02D 13/04* (2013.01); *B60T 2270/604* (2013.01); *B60W 2050/0066* (2013.01); *B60W 2050/146* (2013.01); *Y02T 10/6286* (2013.01); *Y02T 10/6221* (2013.01); *Y10S 903/947* (2013.01)
USPC ............. 701/22; 701/36; 180/65.21; 903/947

(58) Field of Classification Search
CPC . B60W 10/196; B60W 50/082; B60W 50/14; B60W 10/06; B60W 10/08; B60W 30/18127; B60W 2050/0066; B60W 2050/146; B60T 1/10; B60T 7/042; B60T 2270/604; B60L 7/18; Y02T 10/6286; Y02T 10/6221; Y10S 903/947; B60K 6/48; F02D 13/04
USPC .............. 701/22, 36, 56; 477/2–6; 180/65.21, 180/65.25, 65.265–65.285
See application file for complete search history.

(56) References Cited

U.S. PATENT DOCUMENTS 7,131,708 B2 11/2006 Tao
7,163,487 B2 1/2007 Tao
(Continued)

OTHER PUBLICATIONS

Search Report from Corresponding PCT application in same family, Aug. 2013.

*Primary Examiner* — Richard Camby
(74) *Attorney, Agent, or Firm* — Jeffrey P. Calfa; Mark C. Bach

(57) ABSTRACT

A control interface for drivetrain braking provided by a regenerative brake and a non-regenerative brake is implemented using a combination of switches and graphic interface elements. The control interface comprises a control system for allocating drivetrain braking effort between the regenerative brake and the non-regenerative brake, a first operator actuated control for enabling operation of the drivetrain braking, and a second operator actuated control for selecting a target braking effort for drivetrain braking. A graphic display displays to an operator the selected target braking effort and can be used to further display actual braking effort achieved by drivetrain braking.

9 Claims, 4 Drawing Sheets

(51) Int. Cl.
*B60T 7/04* (2006.01)
*B60W 50/08* (2012.01)
*B60K 6/48* (2007.10)
*B60W 50/14* (2012.01)
*B60W 10/06* (2006.01)
*B60W 10/08* (2006.01)
*B60W 30/18* (2012.01)
*B60L 7/18* (2006.01)
*F02D 13/04* (2006.01)
*B60W 50/00* (2006.01)

(56) References Cited

U.S. PATENT DOCUMENTS

| | | | |
|---|---|---|---|
| 8,060,287 | B2 | 11/2011 | Headlee |
| 8,322,473 | B2 * | 12/2012 | Hilberer .................. 180/65.265 |
| 8,596,390 | B2 * | 12/2013 | Soliman et al. ............ 180/65.21 |
| 8,770,328 | B2 * | 7/2014 | Hilberer .................. 180/65.265 |

* cited by examiner

US 8,977,418 B2

OPERATOR INTERFACE FOR VEHICLES

U.S. GOVERNMENT RIGHTS

This concept was made with United States government support under Award No. DE-EE0003303 awarded by the U.S. Department of Energy. The United States government has certain rights in this concept.

BACKGROUND

1. Technical Field

The technical field relates generally to hybrid motor vehicles and, more particularly, to an operator interface for control over braking response of a hybrid vehicle equipped for regeneration braking and compression braking.

2. Description of the Technical Field

The application of parallel hybrid internal combustion/electric drivetrains to commercial or heavy duty vehicles raises operator issues not present in private automobiles. One issue relates to blending braking response derived from the drivetrain braking system where it supports a compression release engine brake function (commonly referred to as a Jake brake or a compression brake) in addition to regenerative braking. Addressing this issue raises other issues relating to operator control over drivetrain braking power.

An internal combustion (IC) engine functioning as a compression brake operates as an air pump which retards the (normally forward) motion of a vehicle. A compression brake is implemented on a diesel cycle IC engine by altering operation of the engine intake and exhaust valves and cutting off fuel flow to the engine. The operation can be described with reference to a single cylinder with both intake and exhaust valves closed, the piston nearing the top of its travel in the cylinder (termed "top dead center") and a charge of compressed air in the cylinder. As the piston reaches the top of its travel the exhaust valve(s) open and compressed air is discharged to the exhaust manifold. The exhaust valve(s) then close and the piston moves toward the bottom of its travel in the cylinder pulling against an increasing vacuum in the cylinder. At the bottom of the piston's travel the intake valve(s) open and air is drawn into the cylinder. The intake valve then closes and the piston travels upwardly compressing the air for another cycle. Energy to force movement of the piston comes from the vehicle's forward motion. The IC engine remains mechanically coupled to the vehicle's drive wheels so the vehicle's momentum provides the energy to back drive the engine to force the cycle. In a typical non-hybrid vehicle equipped with an IC engine modified to operate as a compression brake, an operator can select whether the system is operational and the number of cylinders of the IC engine to be used for braking (e.g., 2, 4 or 6 cylinders) by operation of switches mounted in-side the cab. Thus compression braking is not the default braking mode for a vehicle but is engaged by the driver/operator. When engaged it typically activates upon the driver removing pressure from the vehicle accelerator pedal and does not require depression of the brake pedal. Depression of the brake pedal continues to engage the vehicle's service brakes.

Contemporary hybrid vehicles equipped with a parallel hybrid electric drivetrain use an electrical machine having two modes of operation. One mode is the traction mode where the electrical machine operates as a traction motor drawing power from a storage (traction) battery to provide traction (motive) power for the vehicle. In the other mode the electrical machine functions as an electrical generator which may be back driven from the vehicle's drive wheels to generate electricity, or which may be driven by the IC engine to generate electricity. Power generated by the electrical machine is stored in the vehicle's fraction battery where it can be drawn upon the supply power to the electrical machine in its traction mode. Using the electrical machine as a back driven generator slows the vehicle while recapturing energy which would otherwise be lost as heat. Like the engine compression brake the regenerative braking system provides braking through the vehicle's drive train. While it is known for regenerative braking to be built so that it engages upon release of the accelerator pedal (first mode), regenerative braking usually engages only upon depression of the brake pedal (second mode).

It might appear that regenerative braking could readily displace engine compression braking by provision of operator controls allowing selection of whether regenerative braking is engaged upon release of the accelerator pedal or upon depression of the brake pedal. While it is true that regenerative braking can usually partially displace use of the compression brake it frequently cannot fully replace it. This is due to limitations frequency inherent to a regenerative braking system. For example, regenerative braking generally does not supply as much braking torque as compression braking so compression braking remains a useful supplemental braking source which spares the use of the service brakes. In addition, regenerative braking may not be available if the vehicle's traction battery is fully charged and there is nowhere to store the power. Still, using regenerative braking is given priority since energy absorbed by the compression brake is wasted. Cooperative operation of the elements of the drivetrain braking system is dynamic, varying considerably with conditions.

Issues can arise relating to both modes of hybrid regeneration on a vehicle equipped for compression braking in that either mode can coincide with operation of the compression brake and with operation of the vehicle's service brakes. The potential exists for the loss of kinetic energy that could have been applied to generating electrical power if braking is provided by the compression brake or the service brakes. Driver input mitigates some of these issues.

SUMMARY

On a parallel hybrid electric vehicle, a control interface for implementing operator control over drivetrain braking where drivetrain braking is provided by a regenerative brake and a non-regenerative brake. The control interface comprises a control system for allocating drivetrain braking effort between the regenerative brake and the non-regenerative brake, a first operator actuated control for enabling operation of the drivetrain braking, and a second operator actuated control for selecting a target braking effort for drivetrain braking. A graphic display displays to an operator the selected target braking effort and can be used to further display actual braking effort achieved by drivetrain braking.

DETAILED DESCRIPTION

Figure 1:
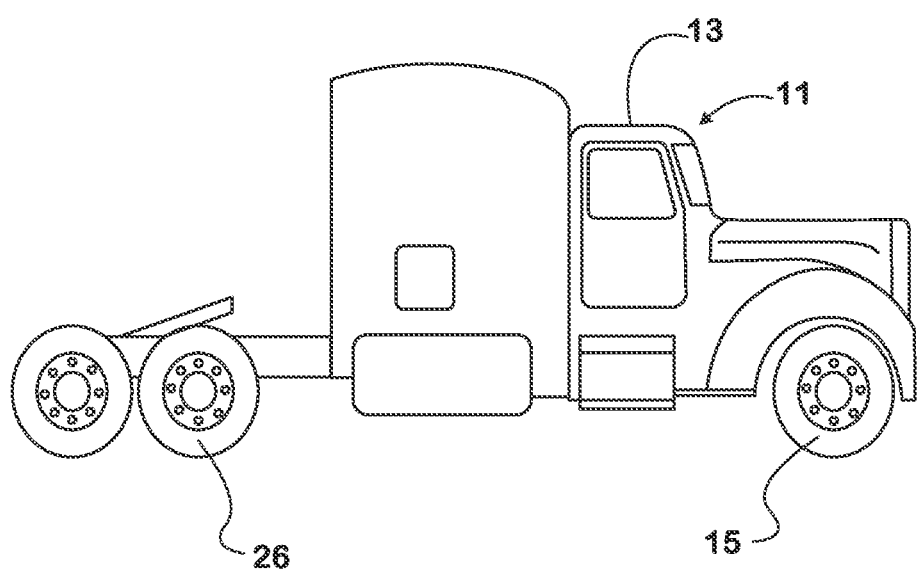
FIG. 1 is a side elevation of a vehicle which may be equipped with a parallel hybrid electric drivetrain and a compression brake.

In the following detailed description, like reference numerals and characters may be used to designate identical, corresponding, or similar components in differing drawing figures. Furthermore, example sizes/models/values/ranges may be given with respect to specific embodiments but are not to be considered generally limiting. In circuit diagrams well-known power and ground connections, and similar well-known elements, may be omitted for the sake of simplicity of illustration.

Referring now to the figures and in particular to FIG. 1, a truck 11 with cab 13 is shown. Truck 11 rides on wheels including non-drive wheels 15 and drive wheels 26. Drive wheels 26 are part of a vehicle drivetrain as described below. Drive wheels 26 are the prime movers for drivetrain braking system components.

Figure 2:
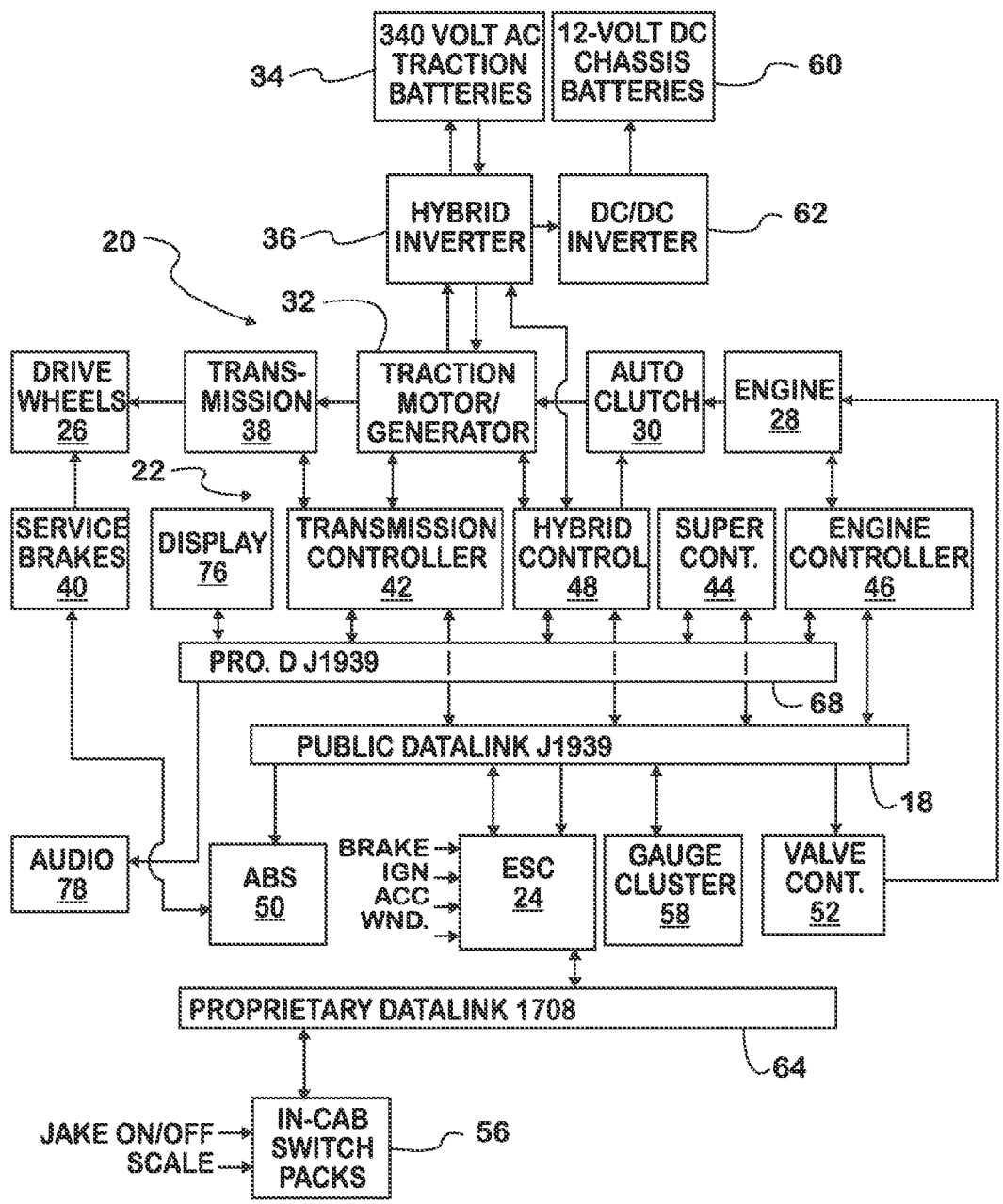
FIG. 2 is a high level block diagram of a control system for the vehicle of FIG. 1.
Figure 3:
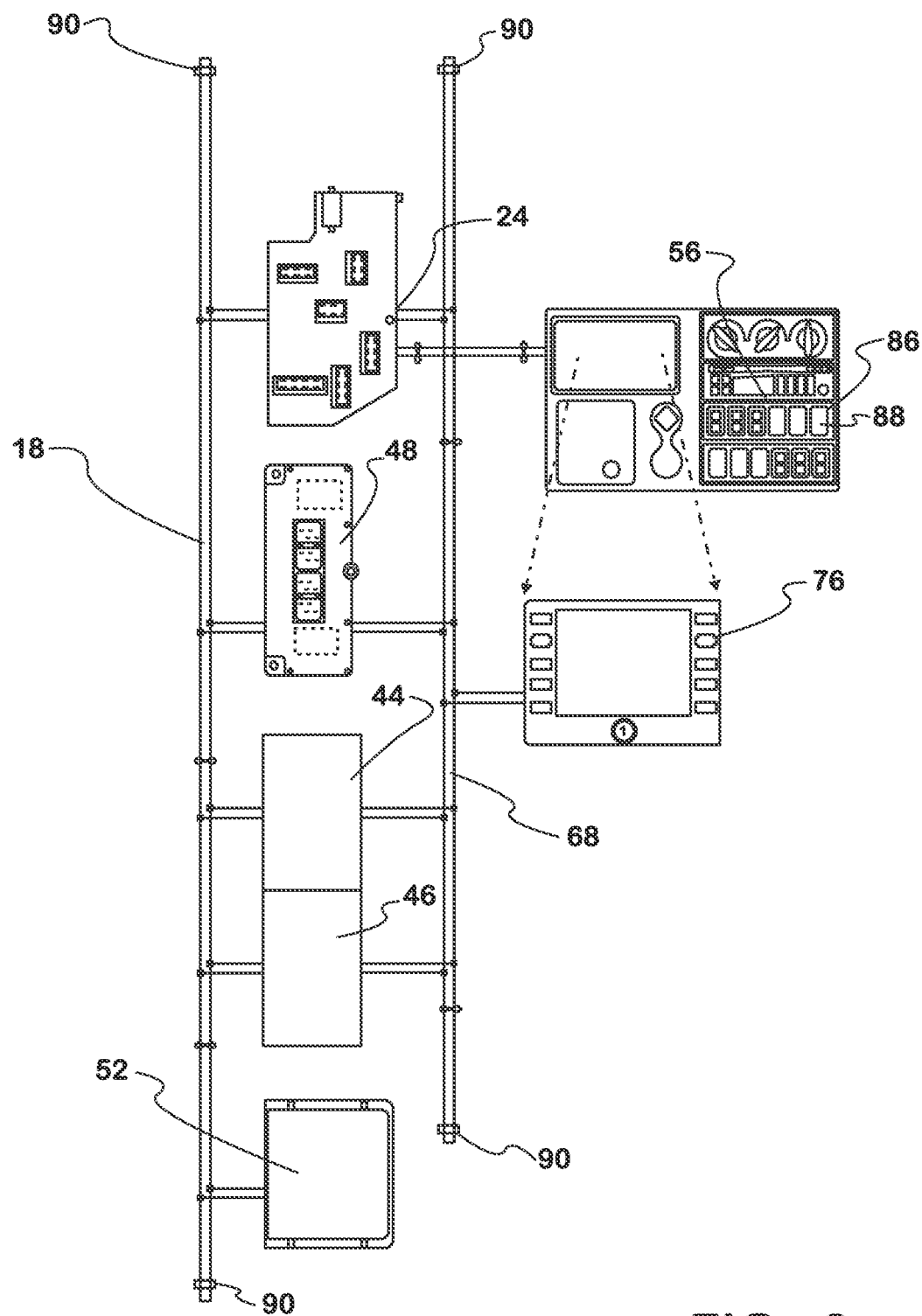
FIG. 3 is a more detailed view of a portion of the control system for the vehicle of FIG. 1.

FIGS. 2 and 3 are, respectively, a high level schematic of a control system representative of systems used for a parallel hybrid electric drivetrain 20 and a more detailed illustration of particular components of an electronic control system 22, including operator controls 56. A display 76 related to particularized control over braking functionality of the drivetrain 20 for truck 11 is optional.

The vehicle drivetrain for truck 11 is a type of parallel hybrid electric drivetrain 20 (hereafter "drivetrain 20") which comprises an internal combustion (IC) engine 28, typically a diesel cycle engine, an autoclutch 30, an electrical machine 32 which can operate in a traction motor mode or in a generator mode for regenerative braking, a transmission 38 and drive wheels 26. Either the IC engine 28 or the electrical machine 32 can provide direct motive (traction) power to the drive wheels and may operate in conjunction with one another to supply traction power. The IC engine 28 can also be used to drive the electrical machine 32 to generate electrical power, possibly while concurrently providing traction power to the drive wheels 26. An autoclutch 30 allows selective coupling and decoupling of the electrical machine 32 from the IC engine 28 to allow operation of the electrical machine, either as a traction motor or a generator, in conjunction with or isolation from the IC engine.

When the electrical machine 32 provides traction power it draws power from traction battery 34 through hybrid inverter 36. Hybrid inverter 36 supplies 3 phase 340 volt rms power. Traction battery 34 is referred to as a traction battery to distinguish it from a secondary 12 volt lead acid battery 60 which may be present to supply power to various low voltage vehicle systems. Alternating current electrical power generated by the electrical machine 32 during regenerative braking is applied to a hybrid inverter 32 which in turn applies direct current power to the traction batteries 34 to maintain their charge. The hybrid inverter 36 may also be used to monitor the traction battery 34 state of charge (SOC), or at least operational variables relating to the traction battery 34 SOC. The operational variables, or the state of charge, depending upon availability, are reported to a hybrid controller 48. Some electrical power may be diverted from hybrid inverter 36 to maintain the charge of a conventional 12-volt DC chassis battery 60, if present, through a voltage step down DC/DC inverter 62.

IC engine 28 is typically a diesel cycle engine. A valve controller 52 is provided for enabling operation of IC engine 28 as a compression brake for retarding forward motion of truck 11.

Electrical machine 32 has two operational modes, a traction motor mode where it operates either alone or in conjunction with the IC engine 28 as the vehicle's prime mover and a generation mode. In its generator mode the electrical machine 32 can absorb torque from the drive wheels 26 through transmission 38 in order to slow a vehicle. The electrical machine 32 can also absorb torque from the IC engine 28 with the drive wheels either coupled or uncoupled by the transmission 38.

Torque sourced from either the electrical machine 32 or from the IC engine 28 is transmitted to the drive wheels 26 through transmission 38. Torque can also be absorbed from the drive wheels 26 by either the electrical machine 32 or the IC engine 28 through a transmission 38. When torque is absorbed by the electrical machine 32 when it operates as a generator and by the IC engine 28 when operating as a compression brake. These operations can occur concurrently.

The vehicle also provides conventional service brakes 40 which operate on the drive wheels 26 (and on non-drive wheels 15) for stopping or slowing the vehicle. Under normal operation, upon the occurrence of braking demand received on a brake input to an electrical system controller (ESC) 24, braking torque is allocated among the vehicle's braking systems including the service brakes 40 and to the electrical machine 32 operating in generation mode (regenerative braking). Upon actuation of the "e-Jake brake" braking demand can also be allocated to the IC engine 28 operating as a compression brake.

The braking elements of drivetrain 20 can be operated to recapture or dissipate energy from the vehicle's inertial momentum during braking or slowing. When energy is recaptured it is called regenerative braking. During regenerative braking transmission 38 allows the electrical machine 32 to be back driven as a generator by the vehicle's forward momentum. Auto-clutch 30 may or may not be disconnected to isolate the IC engine 28 from the electrical machine 32 during this operation depending upon whether compression braking is supplementing or replacing regenerative braking.

When drivetrain braking includes contributions from both the regenerative braking provided by electrical machine 32 and compression braking provided by IC engine 28 allocation of the braking load can become a complex process. The particulars of that process will be reviewed only in brief here. Essentially drivetrain 20 braking contribution is allocated to regenerative braking up its capacity limit, which varies dynamically, then to compression braking. Both the operation of and interaction between drivetrain 20 components are handled by a control system 22, which is described in some detail here.

Control system 22 is based on programmable controllers most of which are dedicated to particular major vehicle systems such as the transmission 38 or IC engine 28. Communications between controllers occurs over communication buses or "datalinks" which may be elements of a controller area network (CAN). The datalinks may conform to the Society of Automotive Engineers J1939 standard. Two such CAN datalinks are used in control system 22, a public datalink 18 and a proprietary datalink 68. Proprietary datalinks conform in all aspects to the SAE standard but may use non-standard codes. In addition an SAE J1708 datalink 64 is provided. The SAE J1939 standard provides for twisted wire pairs with terminating resistors 90.

The controllers generally relate to major vehicle systems and include a transmission controller 42 which controls the transmission 38, a hybrid controller 48 which controls the electrical machine 32, the hybrid inverter 36 and the autoclutch 30, an engine controller which controls the IC engine 28, a valve controller which controls the valves of IC engine 28 and provides for implementing operation of the IC engine as a compression brake, and an antilock brake system (ABS) controller 50 which controls the vehicle's service brakes 40. There are also a gauge controller 58 and a display 76 with an incorporated controller. In addition to controllers which closely relate to particular drivetrain 20 systems there are two higher level controllers. One of these is a hybrid supervisor 44 which coordinates drivetrain 20 braking functions implemented directly by the engine controller 46, the hybrid controller 48 and the valve controller 52. Another is an electronic system controller (ESC) 24 which has supervisory functions and which receives a number of switch and rheostat like inputs including brake pedal position, ignition position (IGN), accelerator pedal position and switch and controller inputs relating to control over the drivetrain 20 braking functions from over an SAE J1708 datalink 64 from an in-cab switch pack 56.

As suggested by the presence of a pair of SAE J1939 datalinks 18, 68, communications occur over two paths depending upon the character of the data. ESC 24 operates as a portals and/or translation devices between the public datalink 18 and all other vehicle datalinks 68, 64. The transmission controller 42, hybrid controller 48 and engine controller 46 all communicate directly with either of the SAE J1939 datalinks 18, 68. Display 76 receives data over SAE J1939 datalink 68 as can an audio device 78 if used for audio haptic feedback. The valve controller 52, gauge cluster 58 and ABS controller 50 communicate directly with the public SAE J1939 datalink 18.

ABS controller 50 controls application of service brakes 40 in response to a braking command from ESC 24. ABS controller 50 may be used to measure vehicle speed from wheel speed sensors (not shown) used to implement an anti-skid algorithm. Vehicle speed also may be measured using a transmission tachometer (not shown) or other means. In any case the relevant controller reports vehicle speed in a CAN formatted signal. The significance of the ABS controller 50 is that indication of wheel skidding indications can result in the ABS controller 50 overriding operation of drivetrain 20 braking and engaging controlled service brake 40 operation, if the brake pedal is depressed.

The transitions between positive and negative traction motor mode contribution by the electrical machine 32 are detected and managed by a hybrid controller 48. Hybrid controller 48 looks at the ABS controller 50 datalink traffic to determine if regenerative kinetic braking would increase or enhance a wheel slippage condition if regenerative braking were initiated. Transmission controller 42 detects related data traffic on datalink 18 and translates these data as control signals for application to hybrid controller 48 over datalink 68.

Operator control over drivetrain 20 braking functions emulates conventional control over a compression brake but invokes both the compression brake function of the IC engine 28 and the backdriven generator function of the electrical machine 32 to produce and electrical "Jake brake" effect. Using a pair of switches 86, 88 from an in-cab switch-pack 56 the operator of a vehicle can enable the system through one center panel mounted switch 86 and choose the desired amount of "e-Jake brake" effort/effect using a second toggle or multi-position switch 88. Switches 86, 88 communicate via datalink 64 to a CAN module such as the ESC 24. ESC 24 then broadcasts the desired amount of "e-Jake braking" effort/effect as requested by the vehicle's operator over the proprietary SAE J1939 datalink 68. The signals are acted upon by the hybrid supervisory control module 44. The hybrid supervisory control module 44 then executes its supervisory role by determining the braking contribution to be made by the regenerative braking and compression braking respectively. The allocation determined the appropriate requests are formulated and broadcast over datalinks 18, 68 for operation upon by other nodes which exercise control over drivetrain 20 components involved in braking including particularly the engine controller 46, the valve controller 52 and the hybrid controller 48.

The amount and type of desired "e-Jake brake" effort/effect is reconfigurable through software programming—making available various levels and scales of braking effort/effect to the operator of the hybrid electric vehicle. In the case where the vehicle is configured with a graphic display 76, the operator control interface switch actuator 88 can be configured as a momentary (3-position, mono-stable) switch actuator. The momentary operator control interface switch actuator 88 can be manipulated by the operator through its various "e-Jake brake" request states while simultaneously a graphic display 76 provides the amount of "e-Jake brake" effort/effect being requested by the operator via the ESC 24 to the hybrid supervisory control module 44, for example, percent of brake effort/effect, Ft-lbs of torque, etc., as verification. In addition, the hybrid supervisory control module 44 can broadcast the actual amount of "e-Jake brake" effort/effect being performed by the electrical machine 32 or the IC engine 28 operating as a compression brake device and display it in the form of graphic dynamic feedback through the graphic display 76.

A momentary operator control interface switch actuator 88 also provides the operator with the ability to incrementally increase or decrease the amount of requested "e-Jake-brake" effort/effect by momentarily maintaining the switch actuator 88 in either of its non-stable active states and releasing it (i.e. "bumping" the switch actuator up or down). If the switch actuator 88 is maintained and "sustained" for an interval of time, the level of "e-Jake-brake" requested effort/effect will increase or decrease automatically such that the operators does not have to repeatedly "bump" the switch actuator 88 to navigate though the full range of available "e-Jake-brake effort/effects. Additionally, the longer the operator sustains the switch actuator 88 in either of its active states the faster the "e-Jake-brake requested effort/effect will increment. This option gives the operator the ability to navigate through the full range of available "e-Jake-brake effort/effect requests at an increasing and, or decreasing rate while the actuator is being maintained and sustained in either of its active states (up or down).

If the vehicle is not configured with a graphic display device 76 it could be difficult for the operator to know or keep track of the amount of variable 'e-Jake brake" effort/effect as request by the momentary operator control interface switch actuator device 88. In the case where a such a hybrid vehicle is not configured with a graphic display device 76 the vehicle's software can be reconfigured to support a 3-position latched (3-position, tri-stable) or other suitable type operator control interface switch actuator 88 designed to mimic the switch operation of a conventional non-hybrid vehicle thermal mechanical engine compression brake device. In this scenario the latching operator control interface switch actuator 88 will serve as the visual feedback mechanism relating the amount of requested "e-Jake brake" effort/effect (e.g., 2, 4, or 6-cylinders) being sent to the hybrid supervisory control module 44 by the vehicle's electric system controller 24.

Figure 4:
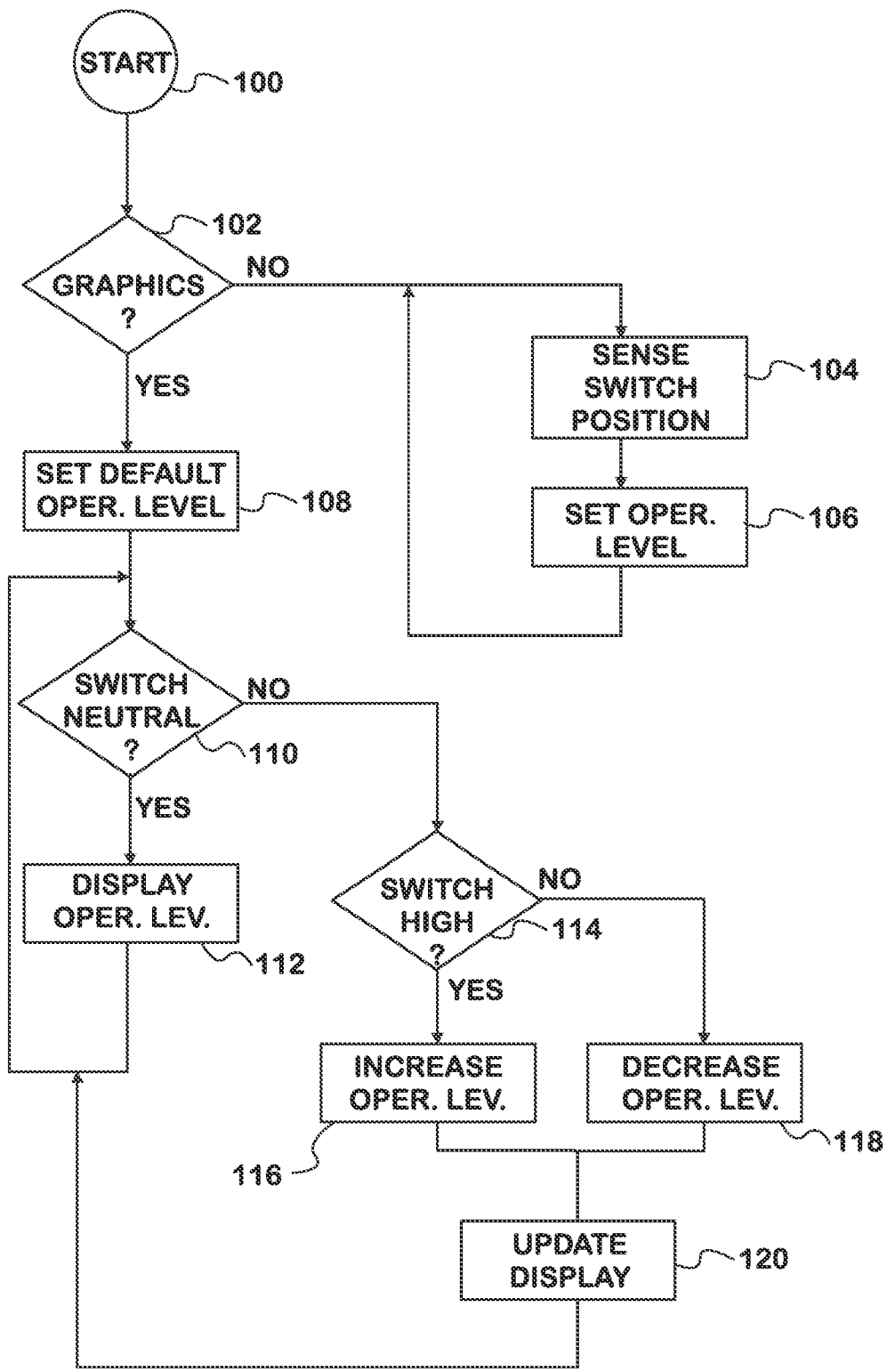
FIG. 4 is a flow chart illustrating operation of the user control interface.

The foregoing steps are illustrated as a flow chart in FIG. 4 where Start (step 100) represents activation of the system upon sensing a position change of switch 86. Step 88 determines if a graph display 76 is available. If not execution advances along the NO step to step 104 where the position of a three position switch 88 is determined to set the effective operational level of drivetrain 20 braking (step 106). This will equal 2, 4 or 6 cylinders. Given the availability of regenerative braking it is possible to provide "6 cylinder" braking capacity on a vehicle equipped with a 4 cylinder IC engine.

If graphics are available more flexible control over drivetrain 20 braking may be implemented along the YES branch from step 102. Initially the operational level of drivetrain braking is set to a default level (step 108) which may be zero. Next, (step 110) switch 88 position is scanned and if neutral the default (current) operational level is displayed at step 112. If the switch 88 position is not at neutral than it is determined if the switch is set to increase drivetrain braking (step 114). If YES the operational level is increased (step 116). If NO the operational level is decreased (step 118). After either step 116 or 118 the display 76 is updated and the program loops back to step 110.

Alternative modes exist for providing feedback where the vehicle audio entertainment system or internal loudspeakers 78 are accessible over either the proprietary J1939 datalink 68 or the public J1939 datalink 18. Loudspeakers 78 may be used to reproduce within the vehicle's cab 13 the full sound associated with operation of a conventional compression brake adjusted for engine RPM's (sourced from the engine controller 46), the selected braking level (2, 4 or 6 "cylinders") of effective braking force while accounting for the proportion of drivetrain braking being contributed by regenerative braking. In addition, haptic feedback can take into account whether the windows are up or down (as determined by ESC 24 from a window position (WIND) input). Such feedback may be provided even where a graphic display 76 is present as confirmation to the operator that the system is working or just for the sake of the operator's enjoyment. Additional haptic feedback can be considered such as adding vibration to the operator's seat when regenerative braking is occurring to simulate the effects of compression braking.

The hybrid supervisory control module 44 has control over valve controller 52 to implement the IC engine 28 compression break operation, and exercises related limited control over the hybrid controller 48 and the engine controller 46. The hybrid supervisory control module 44 integrates operator requests passed from the ESC 24 and coordinates the blending of the breaking effects/efforts of the electrical machine 32 followed by the IC engine 38 compression brake. Once the electric machine 32 has reached it maximum breaking effect/effort (due the high voltage battery state of charge (SOC), temperature, traction motor/generator maximum electrical output and the like), the balance of any remaining requested breaking effort/effect (as requested by the operator interface control device actuator 88) can be satisfied by compression braking using the IC engine 28. If the breaking effect/effort created by the electrical machine 32 is adequate for meeting or exceeding the operators requested drivetrain 20 braking effort/effect, then compression braking is not be employed.

This system provides the operator of a parallel hybrid electric vehicle equipped with at least one electrical machine 32 and at least one IC engine 28 configured for compression braking with the means of controlling the vehicle's drivetrain 20 breaking effects through a series, ratiometric control methodology initiated through an in-cab mounted operator interface control 86, 88 and system performance feedback device 76, 78.

The reconfigurable software and an electrical hardware architecture of the system can be used to control both compression braking of an IC engine 28 and the hybrid electric traction motor/generator to produce an "e-Jake brake" effect from switch-pack mounted, operator control interface switch devices located inside the cab of a vehicle. Disengagement of the "e-Jake brake" simply restores normal vehicle braking response to depression of the brake pedal where braking effort is allocated between the regenerative brake mode of the electrical machine 32 and the service brakes 40. With disengagement of the "e-Jake brake" the compression brake function of the IC engine 28 is not used.

This system provides the operator of a hybrid electric vehicle equipped with at least one electric traction motor/generator and at least one thermal mechanical engine device configured with a compression brake device with the means of controlling the vehicle's drivetrain breaking effects/efforts through a series, ratiometric control methodology initiated through an in-cab mounted operator interface control and system performance feedback device. Lower cost since this system uses the existing vehicle architecture. Enhanced system robustness is achieved by using the datalink and controller environment.

Existing vehicle data link environment is exploited to implement the system taught here to control the operation of the existing chassis and hybrid electric vehicle components, systems and subsystems such as: the thermal mechanical engine device, a thermal mechanical engine device integrated compression break, in-cab operator controls and a in-cab mounted operator system performance display.

What is claimed is:

1. A parallel hybrid electric drivetrain including a control interface for implementing operator control over the drivetrain braking, the parallel hybrid electric drivetrain comprising:
   a drivetrain braking system including a compression brake and a regenerative brake an autoclutch for coupling the compression brake to the regenerative brake;
   a plurality of drive wheels;
   a transmission for coupling the drive wheels to the regenerative brake;
   a source for requested drivetrain braking effort;
   a control system responsive to requested drivetrain braking effort for allocating requested drivetrain braking effort between the regenerative brake and the compression brake including control over engagement of the autoclutch to allow torque from the drive wheels to be applied to the compression brake;
   the control system including a first operator actuated control for enabling operation of the drivetrain braking system and a second operator actuated control for selecting a target braking effort from the drivetrain braking system;
   the regenerative brake being one operational mode of an electrical machine;
   the compression brake being one operational mode of an internal combustion engine; and
   a graphic display interface for displaying the target braking effort.

2. The parallel hybrid electric drivetrain of claim 1, further comprising:
   the graphic display interface for further displaying actual braking effort from the drivetrain braking system.

3. The parallel hybrid electric drivetrain of claim 1, further comprising:
   a sound generation system responsive to requested drivetrain braking effort and engine speed for reproducing sound effects within a vehicle cab emulating full operation of the compression brake.

4. The parallel hybrid electric drivetrain of claim 2, further comprising:
   a sound generation system responsive to requested drivetrain braking effort and engine speed for reproducing sound effects within a vehicle cab emulating full operation of the compression brake.

5. The parallel hybrid electric drivetrain of claim 4, further comprising:
- an electrical machine for providing the regenerative brake and a traction motor;
- an internal combustion engine providing the compression brake;
- a hybrid supervisor for initiating operation of the electrical machine as a regenerative brake and of the internal combustion engine as a compression brake and allocating requested drivetrain braking effort between the electrical machine and the internal combustion engine.

6. A control interface for implementing operator control over the drivetrain braking where the drivetrain braking includes a regenerative brake of limited capacity and a non-regenerative brake, the control interface comprising:
- a control system for allocating drivetrain braking effort between the regenerative brake and the non-regenerative brake;
- a first operator actuated control for enabling operation of the drivetrain braking;
- a second operator actuated control for selecting a target braking effort for drivetrain braking; and
- a graphic display for displaying to an operator the selected target braking effort.

7. The control interface of claim 6, further comprising:
the graphic display further for displaying actual braking effort achieved by drivetrain braking.

8. The control interface of claim 6, further comprising:
a sound system for emulating sounds produced by a compression brake generating an equivalent braking effort to the actual braking effort produced by drivetrain braking.

9. The control interface of claim 6, further comprising:
the non-regenerative brake being a compression brake implemented on an internal combustion engine.

* * * * *